United States Patent [19]

Tarr

[11] 3,954,717
[45] May 4, 1976

[54] DEVICE FOR USE IN ATTACHING OUTLET BOX TO A STUD

[76] Inventor: Charles R. Tarr, N. High St., Bridgton, Maine 04009

[22] Filed: June 10, 1974

[21] Appl. No.: 477,645

[52] U.S. Cl............................ 269/82; 33/DIG. 10; 269/321 S
[51] Int. Cl.² .................................... B25B 11/00
[58] Field of Search .......... 269/6, 50, 76, 77, 321 S, 269/82; 33/DIG. 10, 180 R, 197

[56] References Cited
UNITED STATES PATENTS

| | | | |
|---|---|---|---|
| 2,956,798 | 10/1960 | Briggs | 33/DIG. 10 |
| 2,990,172 | 6/1961 | Gianotta | 33/DIG. 10 |
| 3,436,070 | 4/1969 | Utley et al. | 33/DIG. 10 |
| 3,751,026 | 8/1973 | Stickney | 269/321 S |

*Primary Examiner*—Roy Lake
*Assistant Examiner*—Neil Abrams

[57] ABSTRACT

A device for placing an outlet box in position for attachment to a side of a stud has a mount positionable against the outer face thereof and a vertical support along which the mount is adjustable to place it at the desired height. The mount includes a shoulder that is horizontal when the device is thus positioned and exposed at the side of the stud to enable a box to be held against that side and that shoulder to establish its vertical position. The mount includes a gauge adjustable lengthwise of the shoulder and the gauge has a shoulder that is perpendicular to the shoulder of the mount and engageable by a front edge portion of the held box to establish its required relation to the outer face of the stud.

11 Claims, 7 Drawing Figures

DEVICE FOR USE IN ATTACHING OUTLET BOX TO A STUD

BACKGROUND REFERENCES

U.S. Pat. No. 2,919,913
U. S. Pat. No. 2,956,798
U.S. Pat. No. 2,962,281
U.S. Pat. No. 2,990,172
U.S. Pat. No. 3,436,070

BACKGROUND OF THE INVENTION

In the construction of many buildings, it is a requirement that outlet boxes be attached at the same height to a side of the studs and, additionally, that their front edges be positioned relative to the front or outer faces of the studs by a distance equal to the thickness of the wall that is subsequently to be secured thereto.

Proposals have been made to provide devices that would enable the accurate attachment of the outlet boxes to studs to be expedited. Each such device included a box holder and a support to which the box holder was connected to be positioned therealong to place the supported box at the correct height for attachment to the studs and means enabling the position of the box to be adjusted horizontally.

THE PRESENT INVENTION

The general objective of the present invention is to provide a device that will enable a box to be manually held against the side of a stud in a correct position, both vertically and horizontally, for attachment thereto.

In accordance with the invention this objective is attained with a device in the form of a mount positionable against the outer face of a stud at the desired height and provided with a shoulder that is then horizontal and exposed at the side of the stud to which the box is to be secured and against which the outlet box may be held with a side against the side of the stud. The mount also includes a gauge connected thereto for movement along a path at right angles relative to the stud against which the box is held and means are provided to lock the gauge to the mount in any selected position along the path. The gauge has a shoulder perpendicular to the shoulder of the mount and engageable by a front edge portion of the thus held box to establish the desired position of the front edge of the box relative to the outer face of the stud.

Another principal objective of the invention is to provide a device that may be used in correctly positioning an outlet box on either side of a stud, an objective attained by providing each side of both the mount and the gauge with a box-positioning shoulder.

Another objective of the invention is to provide a device that does not require parts extending along a side of a stud, an objective attained by providing a mount having an end wall engageable with the front face of the stud and desirably narrower than the stud and with the rear edge of its shoulder or shoulders flush with the end wall of the mount.

Yet another objective of the invention is to provide a device of a simple, light weight and easily adjustable construction, an objective attained with a mount that is U-shaped in cross section with the bottom edges of its sides outwardly disposed to provide the shoulders and its closed end engageable with the stud and the gauge also of U-shaped cross section and receiving within it the open end of the mount and with the free ends of its sides outwardly disposed to provide its shoulders and with its bottom edges slidable on the shoulders of the mount.

A device in accordance with the invention usually includes a support that is desirably provided with height measuring indicia and to which the mount is connected for adjustment lengthwise thereof into a position that establishes the correct height for the outlet box. Accordingly, another objective of the invention is to provide the devices with suitable supports, an objective attained with a support dimensioned to fit within the U-shaped mount between its closed end and a fixed clamping member secured to its side walls with the support being tubular, desirably rectangular in cross section, and having a lengthwise slot receiving a clamping member into which a screw is threaded, the screw rotatably supported by the fixed clamping member and extending through said lengthwise slot. A particular objective of the invention is to provide a support consisting of telescoping sections, the inner one the lower section and the upper one including two series of indicia, one series readable with reference to the upper section by itself and the other readable when the two sections are fully extended.

Another objective of the invention is to provide a device in which accurate adjustments of the gauge relative to the mount and of the mount relative to its support are easily effected, an objective attained, in either case by the use of linear measuring indicia in the form of a conventional series of graduations bordering the path of the shoulder or shoulders of the part whose position is being adjusted with the shoulder or shoulders alignable with the graduations.

BRIEF DESCRIPTION OF THE DRAWINGS

A preferred embodiment of the invention is illustrated by the drawings and

THE PREFERRED EMBODIMENT OF THE INVENTION

Figure 1:
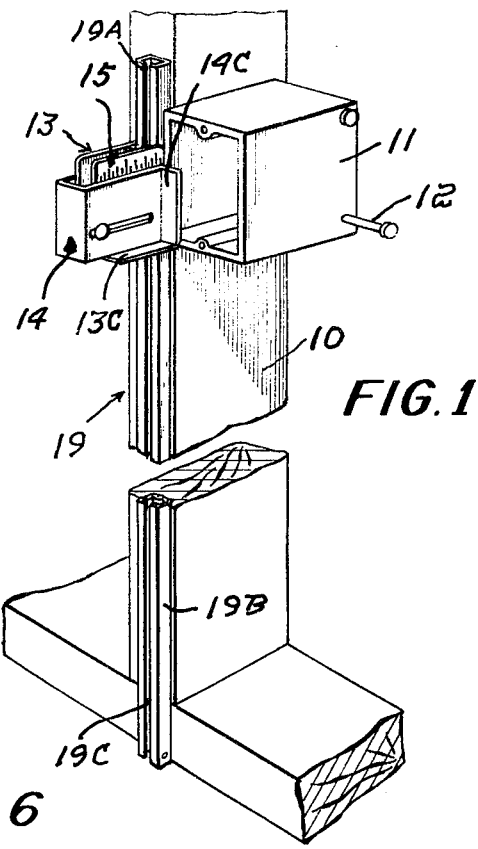
FIG. 1 is a front perspective view of the device being used to place an outlet box in a selected position for attachment to a side of a stud.
Figure 4:
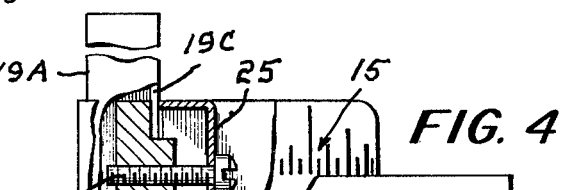
FIG. 4 is a side view of the device broken away to show the connection of the mount to the support.
Figure 5:
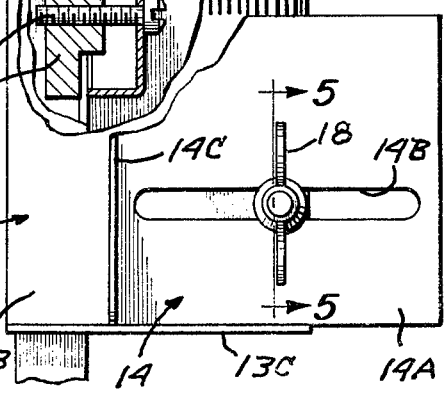
FIG. 5 is a section taken approximately along the indicated line 5—5 of FIG. 4.
Figure 7:
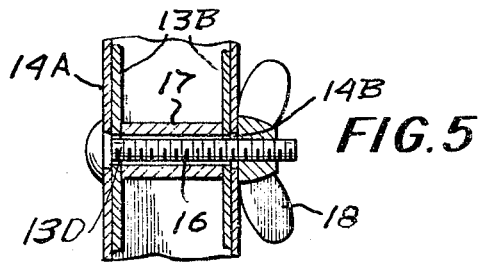
FIG. 7 is a fragmentary view of the rear of the support showing its two series of indicia.

Before detailing the embodiment of the invention illustrated by the drawings, reference is made to FIG. 1 wherein there is shown a stud 10 to one side of which a conventional outlet box 11 is to be secured as by nails 12. It is a common building requirement that all outlet boxes be installed on studs at the same height and that their installation must be made with the front edge of the boxes positioned relative to the front face of the studs as required by the specified thickness of the wall structure that is to be later attached to the studs.

In accordance with the invention, a device enabling outlet boxes to be accurately positioned on the studs 10 includes a mount, generally indicated at 13, that is U-shaped in cross section with its closed end wall 13A flat and disposable against the front or outer face of the stud 10 and with the bottom edges of its sides 13B bent outwardly to provide supporting shoulders 13C that are horizontal when the end wall 13A is held against the front face of the stud 10. A gauge, generally indicated at 14, also U-shaped in cross section, is dimensioned to receive within it the open end of the mount 13 with the bottom edges of its sides 14A slidably supported by the shoulders 13C and provided with transversely aligned lengthwise slots 14B and with the free ends of the sides 14A bent outwardly at right angles thereto to provide shoulders 14C that are at right angles to the shoulders 13C. The height of the gauge 14 is less than that of the mount 13 and the exposed upper portion of each mount side 13B is provided with linear measuring indicia, generally indicated at 15, with reference to which the shoulders 14C are positioned as dictated by the specified wall thickness.

A bolt 16, held captive by holes 13D in the mount sides 13B extends through the slots 14B and through a spacer 17 between the sides 13B. The head end of the bolt 16 is held against rotation by one slot 14B and a wing nut 18, threaded on its other end, is easily turned in one direction to free the gauge 14 for adjustment relative to the mount 13 and as easily turned to lock it in a selected position in which the shoulders 14C are appropriately spaced relative to the front face of the stud 10.

Figure 2:
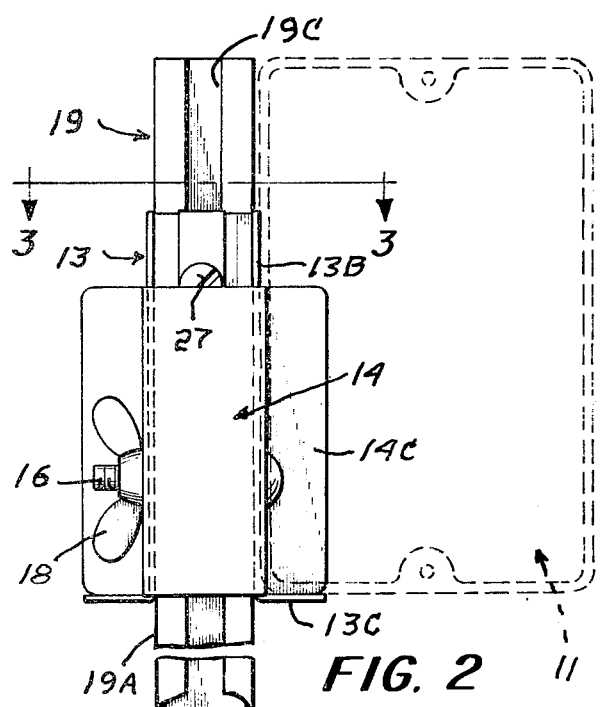
FIG. 2 is a front view of the device on an increase in scale with the support broken away to foreshorten the drawing.
Figure 6:
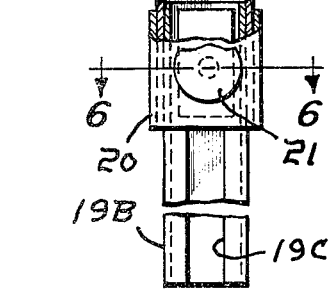
FIG. 6 is a section taken approximately along the indicated line 6—6 of FIG. 2.
Figure 3:
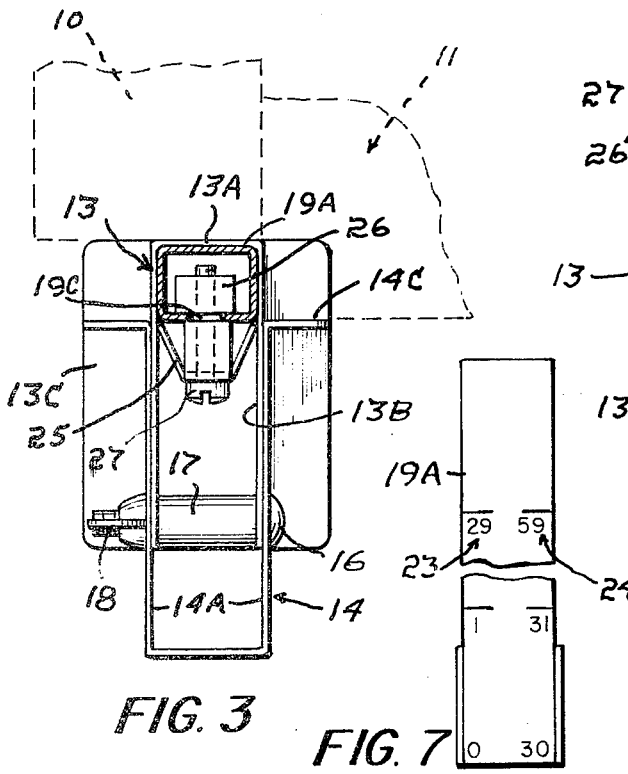
FIG. 3 is a section taken approximately along the indicated line 3—3 of FIG. 2.

With the gauge 14 thus adjusted, the mount 13 may be held against the front face of the stud 10 with a shoulder 13C of the mount and the corresponding shoulder 14C exposed at the side of the stud 10 to which the box 11 is to be secured. With a side of the box held against that stud side and the bottom edge of that box side seated on the exposed shoulder 13C and a portion of its front edge seated against the corresponding shoulder 14C, the thus held box 11 may be then easily and accurately nailed in place. As will be apparent from FIG. 3, the mount 13 is narrower than the stud 10, a preferred but not essential feature. For that reason and because it is desirable that the shoulders 13C and 14C be narrow, the device, when seated against the front face of a stud, has a side 13B flush with that side of the stud to which the box 11 is to be secured.

While the mount 13 may be held in position on a stud with one of its shoulders traversing a mark thereon established by a previous measurement, it is preferred that the device include a height-measuring support, generally indicated at 19. The support 19 is shown as consisting of an upper section 19A and a lower section 19B slidably entered therein, both sections desirably of the same length. In practice, each such section is of a tubular stock that is rectangular in cross section and has a slot 19C extending from end-to-end thereof but with the cross section area of the section 19B such that it is slidable within the section 19A. It is preferred that the section 19A be of sufficient length, in practice thirty inches, to be used without the section 19B when the desired height at which the boxes 10 are to be located is within the usually encountered range. The lower end of the section 19A has an anchor 20 extending across its slot 19C. A screw 21 extends through the anchor 20 and the slot 19C of the sections 19A and 19B and through a clamping nut 22 thus enabling the two sections to be locked together. The face of the section 19A that is placed against the outer face of the stud 10 has linear measuring indicia generally indicated at 23, that are used when the support 19 is thus extended and a second series of graduations 24 that are then to be used with the exposed length of the section 19B in the normal length indication.

In order that the mount 13 may be connected to the support 19 for adjustment lengthwise thereof until its shoulders 13C are in alignment with the appropriate graduation of the measuring indicia, the support 19 is of a cross sectional size and shape such that it may extend through the slideway defined by the end 13A, a clamping member 25 secured to the sides 13B near their upper edges and the included portion of said sides. The slots 19C of the sections 19A and 19B are disposed towards the clamping member 21 to receive the rectangular shank of a clamping nut 26 which is within the sections 19A and 19B. A screw 27, threaded through the nut 26 is rotatably carried by the clamping member 25 and is exposed above the gauge 14 so that its head is accessible enabling the screw to be turned by a screw driver in one direction or the other and to lock the mount 13 to the support 19 or to release it so that it may be slid along the section 19A into a selected position relative thereto. If the section 19B is to be extended, the screws 21 and 27 must both be first released.

From the foregoing, it will be apparent that a device in accordance with the invention is simple in construction and is easily used in quickly and accurately enabling an outlet box to be manually held in its correct position while securing it to the side of a stud. At the same time, the mount itself is so dimensioned that it takes but little room in a tool box and in fact can easily be carried in a pocket.

I claim:

1. A device for use in placing an object such as an outlet box vertically and horizontally relative to the outer face of a stud in a position for attachment to a side thereof, said device including a U-shaped mount with its closed end flat and positionable against said outer stud face at a selected height, at least one side of the mount including an outwardly disposed marginal portion extending lengthwise thereof and establishing a shoulder that is horizontal and exposed laterally of the stud when thus positioned and against which the box may be held with a side against the side of the stud thereby to establish the height of the box relative thereto, and said mount also including a gauge that is U-shaped in cross section and dimensioned to receive the open end of the mount within it and connected thereto for movement along a path at right angles to the stud against which the box is held with the bottom edge of a side slidably supported by the shoulder of the mount, means operable to lock the gauge to the mount in any selected position along said path, at least one side of said gauge also including an outwardly disposed end portion extending transversely thereof and establishing a shoulder disposed at right angles to the shoulder of the mount and engageable by a front edge portion of the thus held box thereby to establish the desired position of said front edge relative to the outer face of the stud, and the side wall of the mount traversed by said gauge shoulder has a series of linear measuring indicia, and an end of said gauge shoulder being close to said series and vertically alignable with a selected one of the indicia.

2. The device of claim 1 and a support including a series of linear measuring indicia spaced lengthwise thereof, means connecting said mount to the support for movement therealong, and means operable to lock the mount to the support in any selected position, said mount shoulder abutting said support and transversely alignable with a selected one of said indicia.

3. The device of claim 2 in which the support includes first and second sections, the first section an upper section and having said series of measuring indicia extending from end-to-end thereof as a measure of its length and the second section slidable within the first section, means releasably locking the two sections together, and said first section also having a series of measuring indicia extending from end-to-end thereof as a measure of the overall length of the support when the sections are fully extended.

4. The device of claim 1 in which both sides of the mount and both sides of the gauge have shoulder-establishing portions.

5. The device of claim 4 in which the width of the flat end of the mount is less than the width of the outer face of the stud.

6. The device of claim 4 in which the overall width of the mount is less than the width of the outer face of the stud.

7. The device of claim 1 in which the lower edges of the sides of its gauge are in slidable engagement with the shoulders of the mount.

8. The device of claim 1 in which the sides of the mount protrude above the sides of the gauge and there include linear measuring indicia extending lengthwise therealong from its closed end and with reference to which the gauge shoulders are readable.

9. The device of claim 8 in which the support has linear measuring indicia extending lengthwise thereby readable with reference to the mount shoulders.

10. The device of claim 1 in which the mount has an internal anchor secured to its sides and defining therewith and with the closed end of the mount a slideway, and a support extends through said slideway, and means carried by said anchor and exposed in the open end of the mount above the closed end of the gauge and operable to lock the mount to the support.

11. The device of claim 10 in which the support is tubular and rectangular in cross section and has a slot extending centrally of one face and extending from end-to-end thereof, a clamping member is slidable within the support, and a rotatable actuating member is held captive by the anchor and threaded into the clamping member operable both to clamp the mount to the support and to release it for adjustment lengthwise thereof.

* * * * *